(12) United States Patent
Washio

(10) Patent No.: US 7,619,627 B2
(45) Date of Patent: Nov. 17, 2009

(54) IMAGE PROCESSING APPARATUS

(75) Inventor: Koji Washio, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 513 days.

(21) Appl. No.: 11/247,865

(22) Filed: Oct. 11, 2005

(65) Prior Publication Data
US 2006/0139353 A1     Jun. 29, 2006

(30) Foreign Application Priority Data
Dec. 24, 2004   (JP)   ............... 2004-373593

(51) Int. Cl.
*G06T 11/00*   (2006.01)
(52) U.S. Cl. .............. 345/470; 345/467; 345/611; 345/501; 345/619; 382/260
(58) Field of Classification Search ............... 345/467, 345/470, 611, 501, 619; 382/260
See application file for complete search history.

(56) References Cited

U.S. PATENT DOCUMENTS

| | | | | |
|---|---|---|---|---|
| 4,084,259 A | * | 4/1978 | Cahill et al. ............... 358/3.2 |
| 4,437,122 A | * | 3/1984 | Walsh et al. ............... 348/625 |
| 4,849,747 A | * | 7/1989 | Ogawa et al. ............... 345/467 |
| 5,086,484 A | * | 2/1992 | Katayama et al. ............ 382/270 |
| 5,357,354 A | * | 10/1994 | Matsunawa et al. ........ 358/530 |
| 5,666,439 A | * | 9/1997 | Ishida et al. ................ 382/190 |
| 5,764,311 A | * | 6/1998 | Bonde et al. ................ 348/746 |
| 5,774,108 A | * | 6/1998 | Michiyoshi ................. 345/467 |
| 5,802,494 A | * | 9/1998 | Kuno .............................. 705/2 |
| 5,900,948 A | * | 5/1999 | Shigeeda et al. ............ 358/448 |
| 5,920,654 A | * | 7/1999 | Someya et al. .............. 382/270 |
| 6,038,348 A | * | 3/2000 | Carley ....................... 382/268 |
| 6,232,978 B1 | * | 5/2001 | Ishida et al. ................ 345/427 |
| 6,731,398 B1 | * | 5/2004 | Yoshizawa ................. 358/1.2 |
| 6,867,787 B1 | * | 3/2005 | Shimizu et al. ............ 345/629 |
| 6,999,119 B1 | * | 2/2006 | Shibazaki et al. .......... 348/273 |
| 7,221,483 B2 | * | 5/2007 | Yagishita et al. ........... 358/3.13 |
| 7,283,645 B2 | * | 10/2007 | Krumm et al. ............. 382/103 |
| 7,298,900 B2 | * | 11/2007 | Kanatsu ..................... 382/176 |
| 2003/0142209 A1 | * | 7/2003 | Yamazaki et al. .......... 348/143 |
| 2004/0126033 A1 | * | 7/2004 | Ishizaka .................... 382/254 |
| 2004/0252882 A1 | * | 12/2004 | Krumm et al. ............. 382/159 |
| 2005/0074144 A1 | * | 4/2005 | Abe et al. ................... 382/106 |
| 2005/0265624 A1 | * | 12/2005 | Washio ....................... 382/273 |
| 2006/0139353 A1 | * | 6/2006 | Washio ....................... 345/467 |

FOREIGN PATENT DOCUMENTS

| | | |
|---|---|---|
| JP | 09-282471 A | 10/1997 |
| JP | 2004-40499 A | 2/2004 |

* cited by examiner

*Primary Examiner*—Javid A Amini
(74) *Attorney, Agent, or Firm*—Frishauf, Holtz, Goodman & Chick, P.C.

(57) ABSTRACT

An image processing apparatus having: a first screen processing section for performing a screen processing to image data; and an outline processing section for determining whether to output or not to output a dot with respect to an outline pixel of the image data, based on an outputting condition of a screen dot for a peripheral pixel of the outline pixel composing an outline area of an image in the image data that has been subjected to the screen processing by the first screen processing section.

11 Claims, 12 Drawing Sheets

▦ : OUTLINE        ▨ : OUTLINE

WHEN Tag = Text FOR
BOTH "Z" AND "G"

▦ : SOL = 1

Tag = Text FOR "Z"
Tag = Graphics FOR "G"

▦ : SOL = 1

C(i,j) : SELECTED PIXEL
Pn(Pi,Pj) : SURROUNDING PIXEL

JAGGY APPEARS

▨ : DOTTED WITH pu

FIG. 10 (a) OUTPUTTED WITH MULTILEVEL
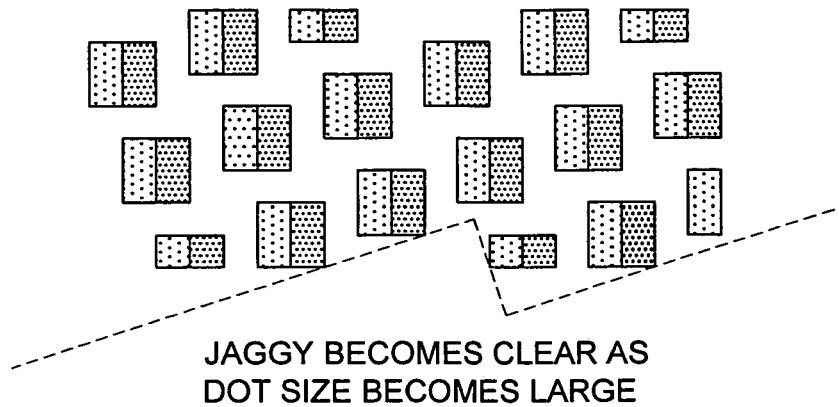
JAGGY BECOMES CLEAR AS DOT SIZE BECOMES LARGE
FIG. 10 (b)
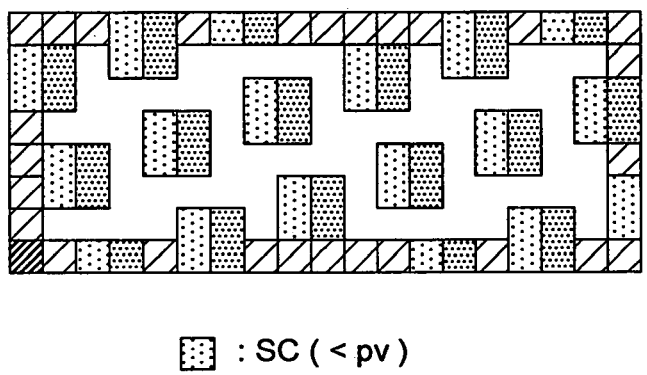
▦ : SC ( < pv )
FIG. 10 (c)
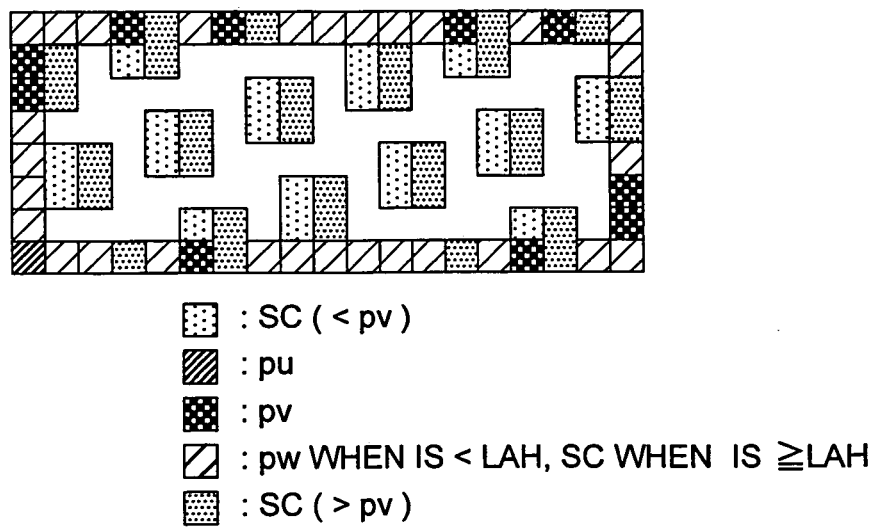
▦ : SC ( < pv )
▨ : pu
▓ : pv
▧ : pw WHEN IS < LAH, SC WHEN IS ≧ LAH
▦ : SC ( > pv )

▧ : SCREEN DOT

⸢⸥ : PIXEL COMPOSING OUTLINE AREA

IMAGE PROCESSING APPARATUS

CROSS REFERENCE TO RELATED APPLICATION

The present application is based on Japanese Patent Application No. 2004-373593 filed in Japanese Patent Office on Dec. 24, 2004.

BACKGROUND OF THE INVENTION

1. Field of the Invention

The present invention relates to an image processing apparatus for performing a screen process for image data.

2. Description of Related Art

When performing the screen process to represent character images in medium tone in a printer, if a regular screen pattern is used, dots are output every specified pixels (points dotted by the screen pattern are referred to screen dots), so that as shown in FIG. 11, a phenomenon called jaggy that notches are seen on the outline area of each character by the screen pattern occurs. When jaggy occurs, the outline area of each character is hardly discriminated, and the visual resolution of the character image is lowered, thus the character image is hardly read.

To prevent an occurrence of jaggy, a method for discriminating a characteristic (characteristic indicating the image kind such as characters and figures) of each pixel from information described in a page description language (hereinafter abbreviated to PDL) and performing an image processing according to the characteristic is disclosed (for example, refer to Patent Document 1). According to the method described in Patent Document 1, for example, for pixels in the image area of characters giving priority to the resolution, a TEXT signal indicating characters is generated, and at time of image processing, in the image area where the TEXT signal is set, a high-resolution screen such as a 400 lpi screen is used, and in the other areas, a low-resolution screen such as a 200 lpi screen is used, so that the screens having different resolution are used appropriately like this, thus the resolution of characters is avoided from deterioration.

On the other hand, as shown in FIG. 12(a), when the outline angle is close to the screen pattern angle, the output interval of screen dots in the outline area becomes longer, so that a problem arises that a long period of jaggy occurs very conspicuously. To solve the problem, it is effective to control the outline angle and screen pattern angle not to become close to each other and shorten the period of jaggy.

As such a method, an art for extracting the outline area of an image on the basis of the PDL, performing a screen process using a line screen pattern in non-outline area, performing a screen process such as error diffusion requiring no angle in the outline area, or performing the screen process by a line screen pattern of an angle different from the ordinary angle according to the outline angle in the outline area, thereby controlling the outline angle and screen angle not to become close to each other is disclosed (for example, refer to Patent Document 2).

Patent Document 1: Japanese Unexamined Laid-Open Patent Publication No. H9-28 Patent Document 2: Japanese Unexamined Laid-Open Patent Publication No. 2004-4 However, at the print and output stage of a printer, when two or more dots are output by ink or toner, the density may vary with the position relationship of dots depending on the printer. For example, between a case that two points are adjacent to each other and a case that two points are apart from each other, the whole density of ink or toner may be different by two dots. The reason is that it depends on a frequency response of the printer, and for output of one dot, the response is slow and ink or toner is not output so much, while for continuous dotting, the response is improved and ink or toner is output satisfactorily. However, such a characteristic varies in degree with the printer.

In the art described in Patent Document 2, when the screen process is switched in the outline area, a phenomenon may occur periodically that in the outline area, dots output by a different screen pattern locally make contact or separate.

For example, as shown in FIG. 12(a), when only the outline area is switched to the 0 degree line screen pattern for the 90 degree line screen pattern, it can be confirmed that a phenomenon that in the output area, dots by a different screen pattern locally make contact or separate occurs periodically.

In consideration of the aforementioned output characteristic of the printer, in the part where the screen dots make contact with, the density increases locally, and if the density increase, regardless of periodically or disordered, is scattered in the outline area, it is seen as jaggy, and the image quality may be deteriorated. The period in which the dots make contact with each other, when the screen angle and outline area angle in the non-outline area are close to each other, becomes longer and jaggy becomes conspicuous much the more.

Further, it may be considered to perform a conituous tone (contone) process for the outline area and add an outline, though a problem that the periodical contact of the outline with the screen dots is seen as jaggy cannot be solved. Further, such an art is limited to a case of application of the line screen pattern and cannot be applied to the dot screen. Even if the dot screen pattern angle used in the outline area is made just different from that used in the non-outline area, as shown FIG. 12(b), a phenomenon that in the outline area, dots by a different screen pattern locally make contact or separate occurs periodically and a problem similar to that of the line screen pattern arises.

SUMMARY OF THE INVENTION

A problem of the present invention is to provide an image processing apparatus for canceling or effectively reducing jaggy in the outline area caused by the screen process.

The above problem can be solved by the following embodiment.

(1) An image processing apparatus including:

a first screen processing section for performing a screen processing to image data; and an outline processing section for determining whether to output or not to output a dot with respect to an outline pixel of the image data, based on an outputting condition of a screen dot for a peripheral pixel of the outline pixel composing an outline area of an image in the image data that has been subjected to the screen processing by the first screen processing section.

BRIEF DESCRIPTION OF THE DRAWINGS

FIG. 10(a) is a drawing showing the outputting condition of the screen dots before execution of the outline process, and FIG. 10(b) is a drawing showing the state that screen dots are added to the pixels composing the outline area by the outline process, and FIG. 10(c) is a drawing showing the state that the output level of the screen dots of the pixels composing the outline area is further changed by the outline process;

DETAILED DESCRIPTION OF THE PREFERRED EMBODIMENT

Figure 1:
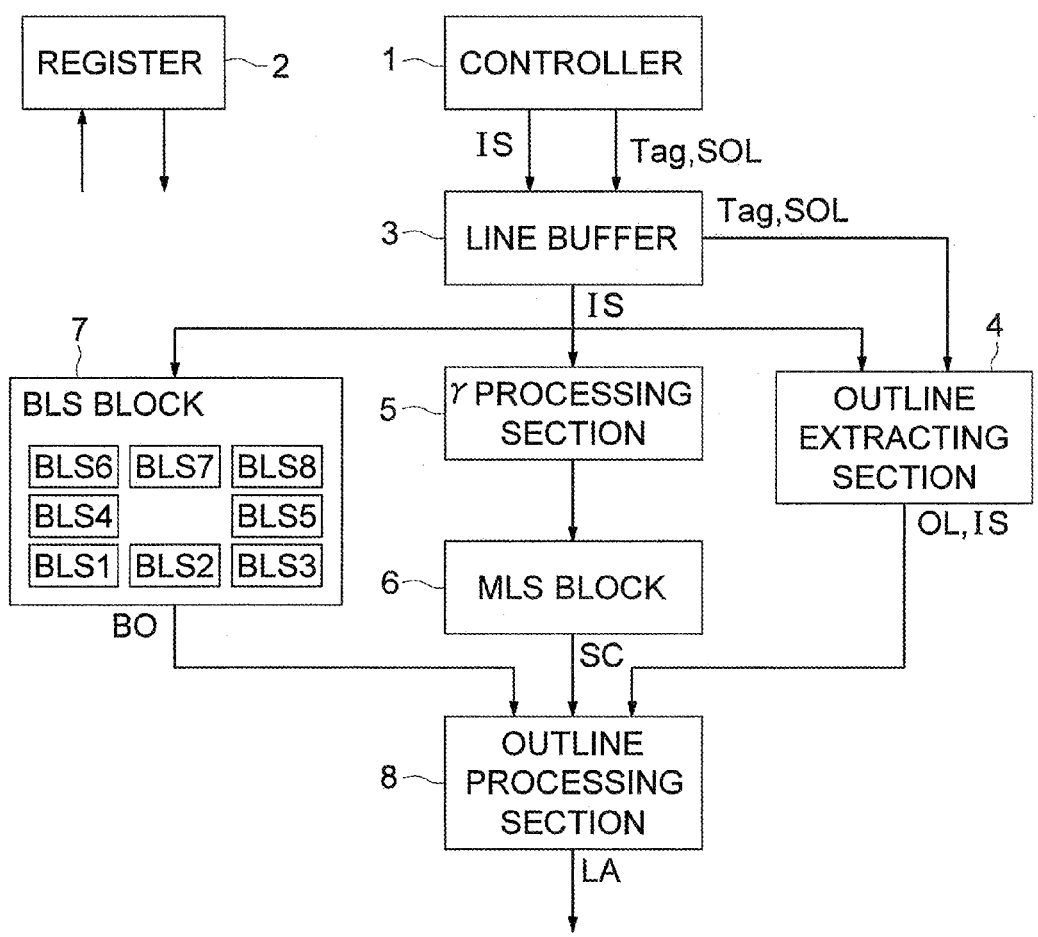
FIG. 1 is a drawing showing the internal constitution of the image processing apparatus of this embodiment.

The above problem can be solved further by any of the following items of embodiments.

(2) The image processing apparatus of item (1), wherein the outline processing section determines to output a dot with respect to the outline pixel, when the outline pixel and the peripheral pixel for which the screen dot is outputted are apart with each other by a prescribed distance or more.

(3) The image processing apparatus of item (1), wherein the outline processing section judges the number of peripheral pixels for which screen dots are outputted at an area within a prescribed region from the outline pixel, and according to a result of judging the number, the outline processing section determines to output the dot with respect to the outline pixel.

(4) The image processing apparatus of any one of items (1) to (3), wherein when to output the dot is determined with respect the outline pixel, the outline processing section determines an outputting level of the dot.

(5) The image processing apparatus of item (4), wherein the outline processing section determines the output level of the dot according to a pixel value level of the outline pixel for which the dot is determined to be outputted, or to a pixel value level of the peripheral pixel.

(6) The image processing apparatus of any one of items (1) to (5), further comprising an outline extraction section for extracting an outline area from the image data, and for creating outline information indicating an outline pixel composing the extracted outline area, wherein the outline processing section identifies the outline pixel based on the outline information created by the outline extracting section.

(7) The image processing apparatus of claim 6, wherein the outline extracting section creates the outline information based on a PDL (Page Description Language) inputted or the image data with image distinguishing signals inputted with the image data.

(8) The image processing apparatus of any one of items (1) to (7), further comprising a second screen processing section for performing a screen processing to the image data, wherein the outline processing section determines whether to output a dot with respect to the outline pixel of the image data having been subjected to the screen processing by the second screen processing section.

(9) The image processing apparatus of any one of items (1) to (8), wherein the first screen processing section performs the screen processing to the peripheral pixel of the outline pixel, and determines whether to output the screen dot with respect to the peripheral pixel.

(10) The image processing apparatus of item (8) or (9), wherein the screen processing by the first screen processing section and the screen processing by the second screen processing section are performed in parallel.

(11) An image processing apparatus comprising:

a first screen processing section for performing a screen processing to image data; and an outline processing section for changing an output level for the outline pixel of the image data, based on a result of the screen processing to a peripheral pixel of the outline pixel composing an outline area of an image in the image data that has been subjected to the screen processing by the first screen processing section.

(12) The image processing apparatus of item (11), further comprising a second screen processing section for performing a screen processing to the image data, wherein the outline processing section changes the output level with respect to the outline pixel of the image data, the image data having been subjected to the screen processing by the second screen processing section.

(13) The image processing apparatus of item (11) or (12), wherein the first screen processing section performs the screen processing to the peripheral pixel of the outline pixel, and determines whether to output a screen dot with respect to the peripheral pixel.

(14) The image processing apparatus of item (12) or (13), wherein the screen processing by the first screen processing section and the screen processing by the second screen processing section are performed in parallel.

(15) The image processing apparatus of any one of items (11) to (14), wherein the outline processing section changes the output level of the dot with respect to the outline pixel according to the pixel value level of the outline pixel or of the peripheral pixel.

EMBODIMENTS OF THE INVENTION

Hereinafter, the embodiments of the present invention will be explained in detail with reference to the accompanying drawings.

Firstly, the constitution will be explained.

FIG. 1 shows the internal constitution of an image processing apparatus 10 of this embodiment.

As shown in FIG. 1, the image processing apparatus 10 is structured so as to include a controller 1, a register 2, a line buffer 3, an outline extracting section 4, a γ processing section 5, an MLS (multi-level screen) block 6, a BLS (bi-level screen) block 7, and an outline processing section 8.

The controller 1 externally receives input image data IMAGE and PDL data which are to be processed, converts the color for each coloring material (here, four colors of Y (yellow), M (magenta), C (cyan), and K (black)) used when printing and outputting the image data IMAGE, and furthermore generates image data IS for each pixel by the rasterizing process.

Further, on the basis of the PDL data, the controller 1 generates an image discrimination signal Tag. The image discrimination signal Tag includes three kinds of Image indicating an image part of a picture, Text indicating characters, and Graphics indicating a line drawing.

The generated image data IS for each color and image discrimination signal Tag are output to the outline extracting section 4, the γ processing section 5, and the BLS block 7 via the line buffer 3 respectively.

Further, the controller 1, on the basis of the PDL data, may generate a flag signal SOL indicating the outline areas of Graphics and Text and output it to the outline extracting section 4. At present, each object of many characters and line drawings is vector data and the outline of each of the objects can be obtained by using the function of PDL. Or, it is possible to load an object into image data as it is and then generate an outline signal by the same procedure as that of a flag signal OL of the outline extracting section 4.

Hereinafter, the SOL generating method will be explained by referring to FIG. 2.

Figure 2:
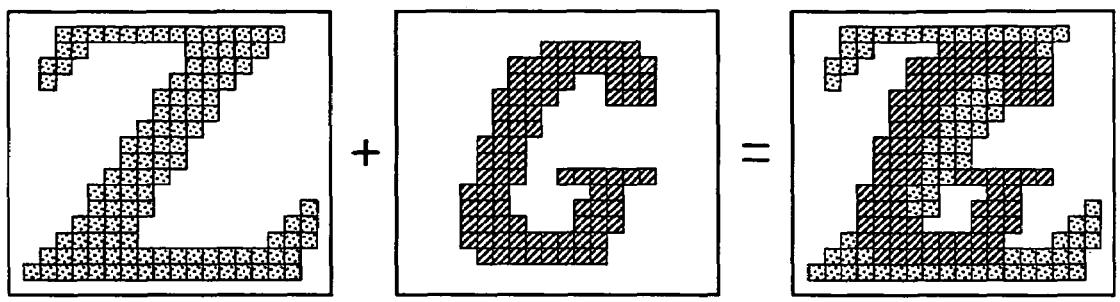
FIGS. 2(a) to (2(d) are drawings for explaining a method for generating a flag signal SOL on the basis of the PDL.
Figure 2:
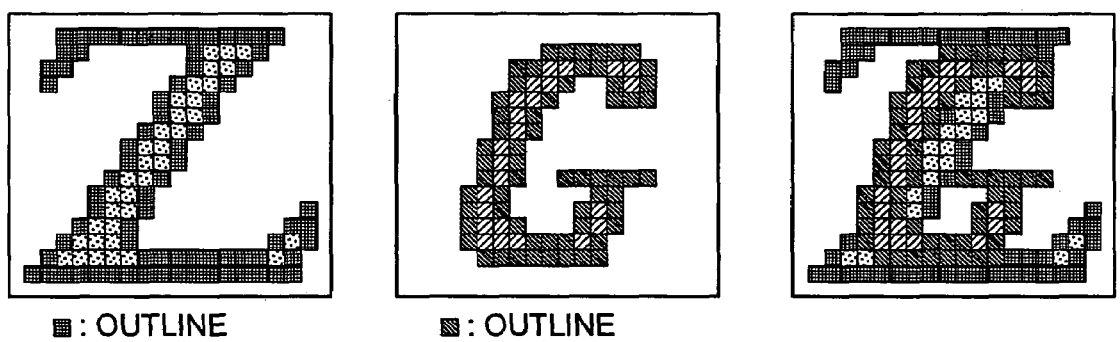
Figure 2:
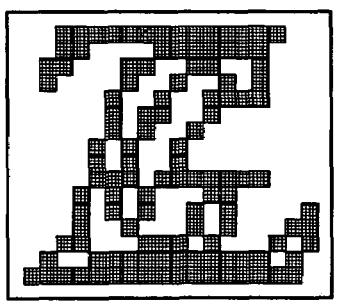
Figure 2:
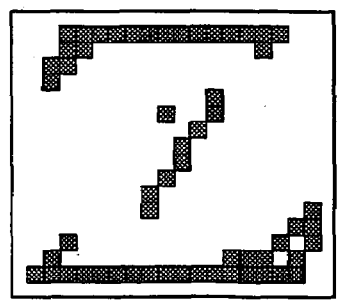

For example, as shown in FIG. 2(*a*), when outputting an image in which the object G is superimposed on the object Z, a part where the image of Z is overwritten with the image of G occurs.

Here, as shown in FIG. 2(*b*), a case that the outline areas of the respective objects are obtained and then the object G is superimposed on the object Z will be considered.

When the image discrimination signals Tag of the objects Z and G are Text, as shown in FIG. 2(*c*), for the pixels of the outline areas of Z and G, SOL=1 is set and for the pixels of the other areas, SOL=0 is set. On the other hand, although Tag of the object Z is Text, when Tag of G is Graphics, as shown in FIG. 2(*d*), for the pixels of the part where the outline area of G is removed from the outline area of Z, SOL=1 is set and for the pixels of the other areas, SOL=0 is set.

SOL set like this is output to the outline extracting section 4.

Further, the controller 1 generates a switch signal LASW indicating whether or not to perform the outline process in the outline processing section 8 and outputs it to the outline processing section 8. For example, when the image processing apparatus 10 is installed in a copier or a printer, if instruction information indicating execution of the outline process is input from the copier or printer, LASW=1 is set according to the concerned instruction information and if instruction information indicating no execution of the outline process is input, LASW=0 is set.

The register 2 stores parameters necessary to process the sections 1 to 8 and according to reading requests from the sections 1 to 8, outputs designated parameters.

Concretely, the register 2 stores parameters such as edTH used by the outline extracting section 4, TH1tb1 and TH2tb1 which are LUTs (look up tables) used by the MLS block 6, and AU, AV, AW, BU, BV, BW, LAL, LAH, and DON used by the outline processing section 8. The parameters will be explained together at time of explanation of the sections 1 to 8 which will be described later.

The line buffer 3 retains four lines of the main scanning lines of the image data IS input from the controller 1, retains three lines thereof for the image discrimination signal Tag, and sequentially outputs them to the outline extracting section 4, the γ processing section 5, and, the BLS block 7.

The outline extracting section 4 detects the outline area from the image data IS input and generates an flag signal OL as outline information indicating whether each pixel is a pixel composing the outline area or not. The flag signal OL is generated for each color.

Hereinafter, the flag signal OL generating method by the outline extracting section 4 will be explained.

Figures 3, 4:
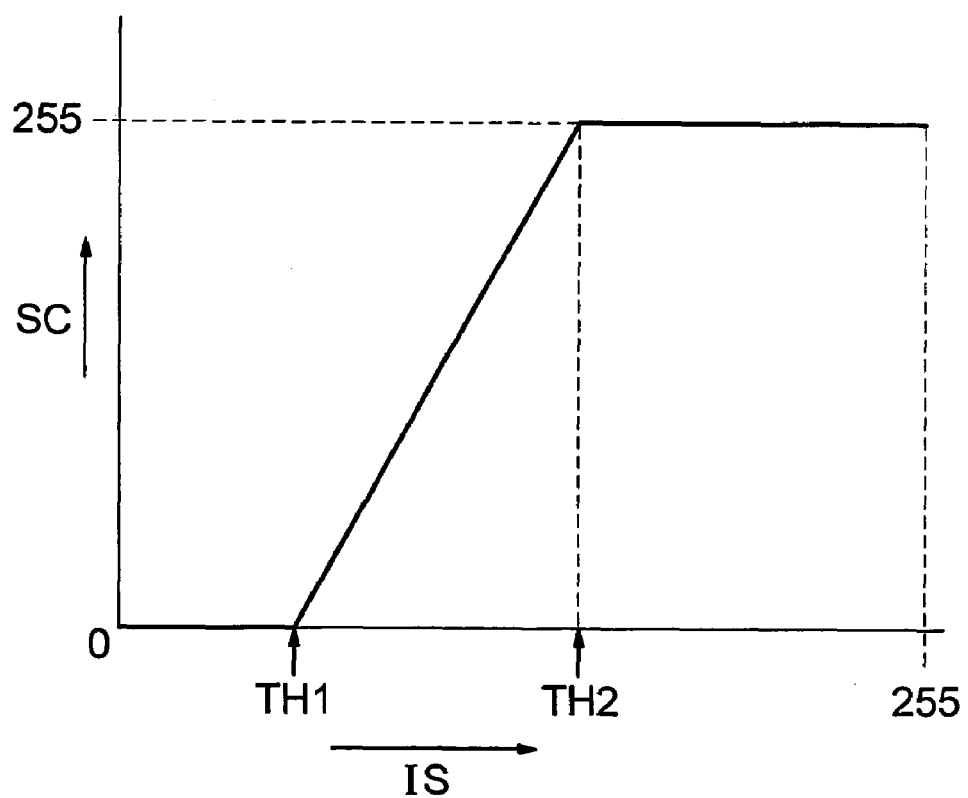
FIG. 3 is a drawing showing the situation that the peripheral pixels of the selected pixel C are separated.
FIG. 4 is a drawing showing the function for outputting the output value SC subject to the screen process for the input value IS.

Firstly, as shown in FIG. 3, a selected pixel C is set for the image data IS, and the pixels are separated in a mask size of 3 pixels×3pixels around the selected pixel C, and peripheral pixels In (n=1 to 8) are obtained. Further, when the separated area includes a part other than the area of the image data, the pixel value of the part is set to 0.

Next, from the formulas (1) and (2) indicated below, differences E1[ch] to E8[ch] between the selected pixel C[ch] and the peripheral pixels I1[ch] to I8[ch] are obtained. Further, [ch] indicates an element indicating colors y, m, c, and k of an image under processing.

$$En[ch]=C[ch]-In[ch] \quad (1)$$

$$-En[ch]=In[ch]-C[ch] \quad (2)$$

And, among the obtained Ens[ch], the maximum value in the positive direction of the four pixels neighboring with the selected pixel C[ch] is obtained and it is assumed as a positive edge signal Ped. Further, the maximum value of each En[ch] in the negative direction is obtained and it is assumed as a reversed edge signal Red[ch].

Ped[ch] and Red[ch] are expressed by Formulas (3) and (4) indicated below.

$$Ped[ch]=\mathrm{Max}(E2[ch], E4[ch], E5[ch], E7[ch]) \quad (3)$$

$$Red[ch]=\mathrm{Max}(-E2[ch], -E4[ch], -E5[ch], -E7[ch]) \quad (4)$$

where Max (X) indicates a function for outputting a maximum value, and when Ped[ch] and Red[ch] are less than edTH, Ped[ch] and Red[ch] are set to 0.

Further, the threshold value edTH is obtained from the register 2.

En[ch], Red[ch], and Red[ch] obtained in this way are parameters indicating edge strength.

Next, using the parameters indicating the edge strength, as an index value indicating a visual contrast at the edge of a character and a background, Tp and Tr are obtained.

Tp and Tr are obtained from Formulas (5) and (6) indicated below.

$$Tp=(Ped[y]\times Wy+Ped[m]\times Wm+Ped[C]\times Wc+Ped[k]\times Wk)/256 \quad (5)$$

$$Tr=(Red[y]\times Wy+Red[m]\times Wm+Red[C]\times Wc+Red[k]\times Wk)/256 \quad (6)$$

where the coefficients Wy, Wm, Wc, and Wk meet Wy+Wm+Wc+Wk≦255.

When performing a process according to the visual density difference, it is desirable to input a coefficient equivalent to specific visibility to the coefficients Wy, Wm, Wc, and Wk. Even if Y (yellow) is at the maximum density, no visual density difference is obtained compared with other colors. Further, for K (black), a most visual density difference is obtained, so that this relationship is reflected and for example, it is desirable to set Wy=16, Wm=32, Wc=80, and Wk=127.

Next, Tp and Tr are compared. When a condition of Tp>Tr is satisfied, the selected pixel C is judged to belong to the outline area, and the value of OL is set to OL=1 indicating the pixels (hereinafter, referred to as outline pixels) composing the outline area, and when a condition of Tp>Tr is not satisfied, the selected pixel C is judged not to belong to the outline area, and the value of OL is set to OL=0 indicating no outline pixels. Further, when the image discrimination signal Tag is referred to and Tag=Image, OL=0 can be always set. By doing this, outline emphasis unnecessary for a picture image can be avoided. Further, when SOL is input from the controller 1, according to SOL, for a pixel set at SOL=1, OL=1 is set and for a pixel set at SOL=0, OL=0 is set.

The flag signal OL generated in this way is outputted to the outline processing section 8.

Next, the MLS block 6 will be explained.

The image data IS outputted from the line buffer 3 is subject to γ correction by the γ processing section 5 and then is outputted to the MLS block 6.

The MLS block 6 performs a multilevel screen process for the image data IS input, generates processing image data SC, and outputs it to the outline processing section 8.

Hereinafter, the multilevel screen process will be explained.

Firstly, for the image data IS input, a screen pattern composing a threshold matrix is set (this screen pattern is referred to as a cell) and threshold values TH1 and TH2 (TH1<TH2) corresponding to each element are obtained.

Here, the number of elements in the main scanning direction of the cells is assumed as M, the number of elements in the sub scanning direction as N, and the shift amount of the screen pattern as α, and the selected pixel C (the position coordinates are set to (i, j)) is scanned, and from Formulas (7) to (9) indicated below, an element e indicating the position of the selected pixel in the screen pattern is obtained.

$$e = sai + saj \times M \quad (7)$$

$$sai = \{i + (j/N) \times \alpha\} \% M \quad (8)$$

$$saj = j \% N \quad (9)$$

where sai and saj indicate index values indicating the position of the element e in the screen pattern.

Next, the tables TH1tb1[ch] and TH2tb1[ch] which are LUTs for deciding the threshold values TH1 and TH2 are read from the register 2. TH1tb1[ch] and TH2tb1[ch] are tables in which the output values TH1 and TH2 corresponding to the input value e are preset respectively. To TH1tb1[ch] and TH2tb1[ch], the element e obtained from the formula aforementioned is input and corresponding output values TH1[ch][e] and TH2[ch][e] are obtained. Further, so as to establish TH1[ch][e]<TH2[ch][e], TH1tb1[ch] and TH2tb1[ch] are prepared.

Using TH1[ch][e] and TH2[ch][e] obtained, the image data SC after the screen process is obtained from Formula (10) indicated below.

$$SC[ch][e] = \{(IS - TH1) \times 255 / (TH2 - TH1)\} \quad (10)$$

where when SC<0, SC=0 and when SC>255, SC=255.

The function SC[ch][e] indicated by Formula (10) is a function as shown in FIG. 4.

The aforementioned multilevel screen process will be explained concretely by referring to FIG. 5.

Figure 5:
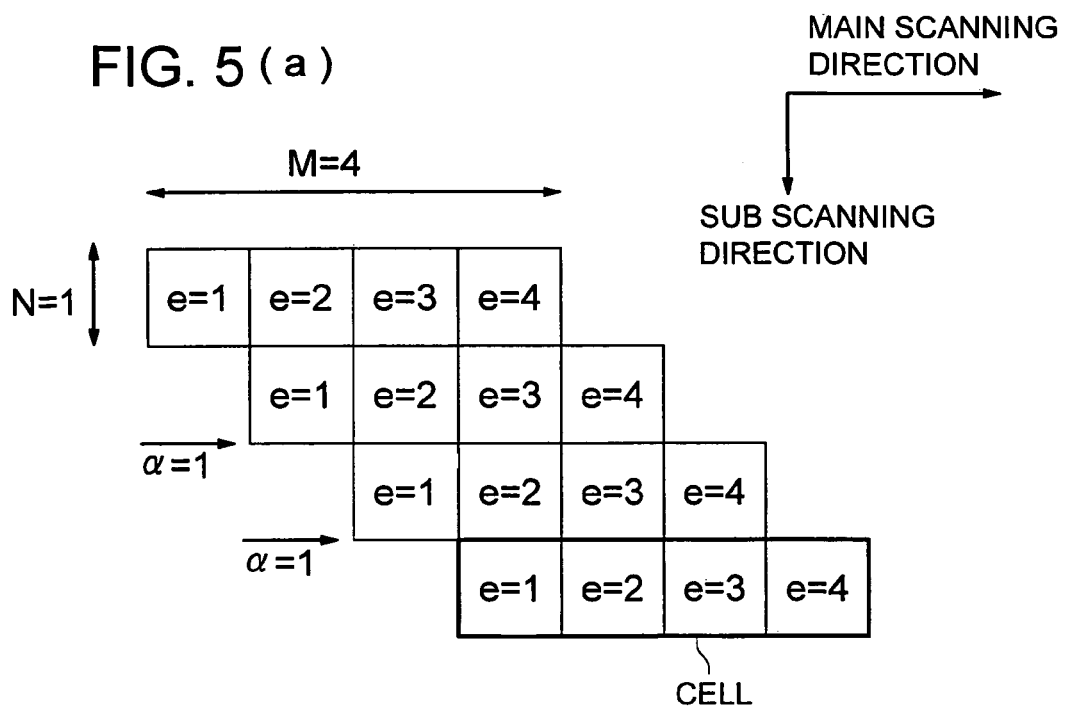
FIG. 5(a) is a drawing showing the situation that screen cells are set for an image.
FIG. 5(b) is a drawing showing the function of each element in the screen cells.
Figure 5:
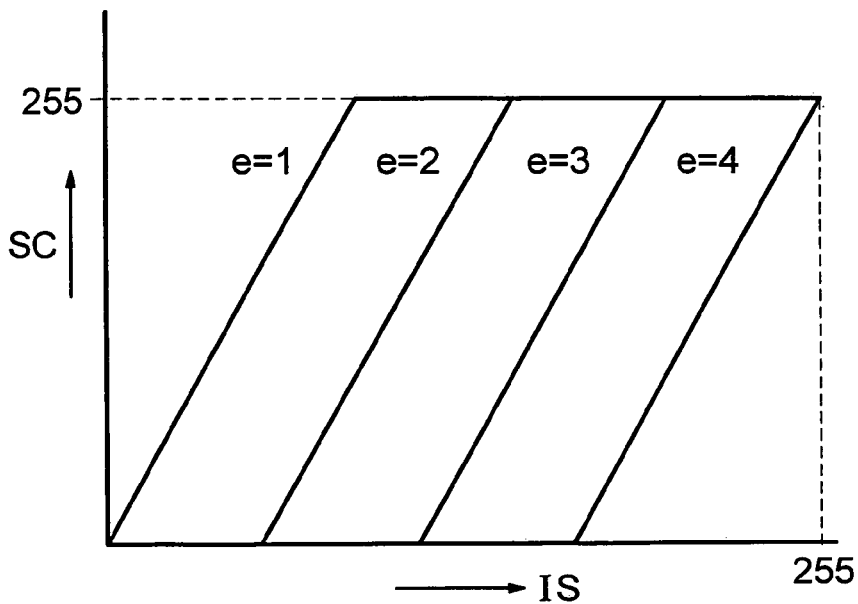

As shown in FIG. 5(*a*), when using a screen pattern with a screen size of M=4 and N=1 and a shift amount of α=1, the relationship of the output value SC with the input value IS indicated by Formula (9) can be expressed by the function shown in FIG. 5(*b*). As shown in FIG. 5(*b*), in the respective elements e=1 to e=4 in the cells, different functions SC[ch][e] are set.

Next, the BLS block 7 will be explained.

The BLS block 7 performs the screen process for the peripheral pixels of the selected pixel, thereby generates a flag signal BO indicating whether screen dots are outputted around the selected pixel or not, and outputs it to the outline processing section 8.

Figure 6:
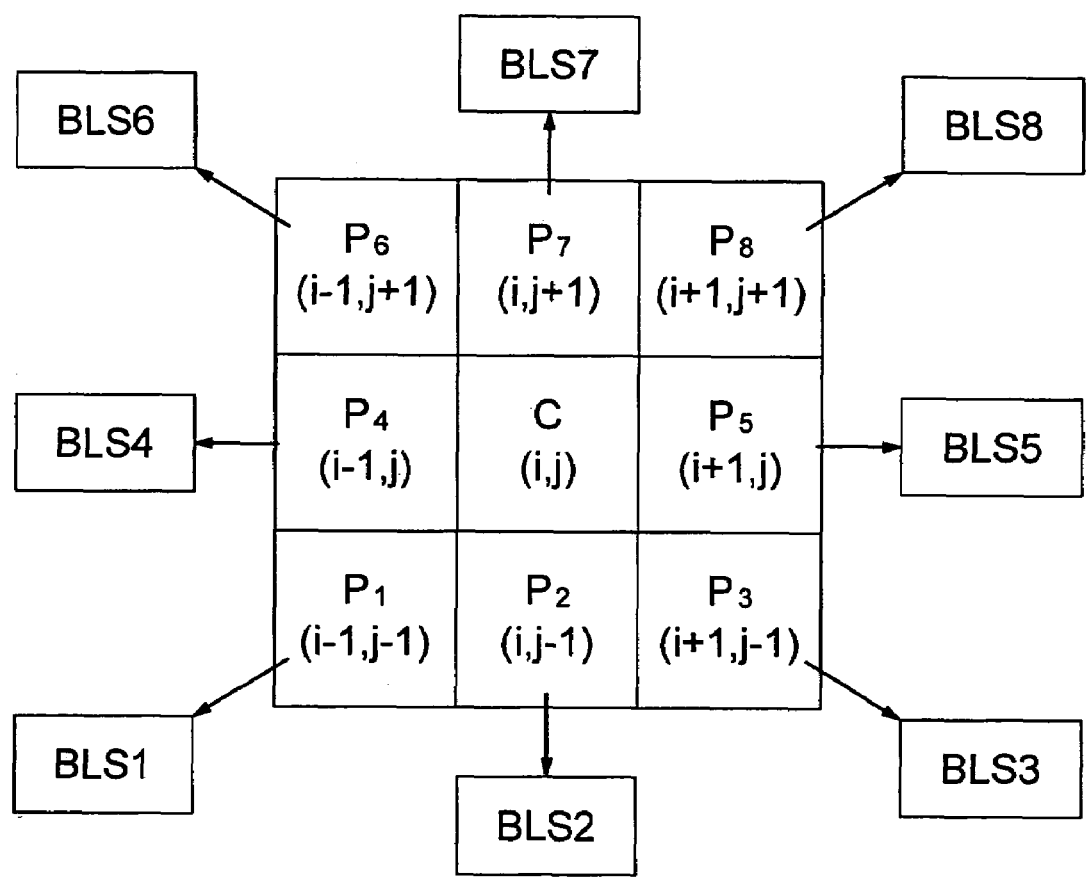
FIG. 6 is a drawing showing the position coordinates (pi, pj) of the peripheral pixels Pn input to BLS1 to BLS8.

The BLS block 7 has eight BLS units (hereinafter, indicated by BLSn (n=1 to 8)) corresponding to the peripheral pixels of the selected pixel, obtains simultaneously eight pixels Pn (n=1 to 8) existing around the selected pixel from the line buffer 3, and as shown in FIG. 6, outputs them to BLS1 to BLS8 respectively corresponding to the pixel positions. BLS1 to BLS8 perform the screen process for the input pixels Pn. The BLS block 7 may find that screen dots are outputted to the peripheral pixels Pn or not and does not need to calculate the output level, so that the screen process by BLS1 to BLS8, unlike the screen process performed by the MLS block 8, obtains a threshold value BTh[ch][e] of each element in the screen pattern and just discriminates whether the output level is larger than the threshold value BTh[ch][e] or not.

Hereinafter, the screen process performed by BLS1 to BLS8 will be explained. BLS1 to BLS8 have the same constitution and perform the same process.

In BLS1 to BLS8, the parameters such as the sizes M and N and shift amount α of the screen pattern used in the screen process are the same as the parameters used by the MLS block 6.

Assuming the position coordinates of the selected pixel C as (i, j), the position coordinates (pi, pj) of the peripheral pixels Pn input to BLS1 to BLS8 are indicated as shown in FIG. 6.

On the basis of the position coordinates Pn(pi, pj) of the peripheral pixels, in the same way as with the screen process by the MLS block 6, by Formulas (11) to (13) indicated below, the elements e indicating the positions in the screen pattern set in the peripheral pixels are obtained.

$$e = sai + saj \times M \quad (11)$$

$$sai = \{pi + (pj/N) \times \alpha\} \% M \quad (12)$$

$$saj = pj \% N \quad (13)$$

Next, from the obtained elements e, a threshold value BTh[e] corresponding to each peripheral pixel in the screen pattern is obtained from Formula (14) indicated below.

Expression 7

$$Bth[ch][e] = inv\gamma\{TH1[e] + (TH2[e] - TH1[e]) \times PON / 100\} \quad (14)$$

where invγ indicates an inverse function of the γ function used in the γ process.

Further, TH1[ch][e] and TH2[ch][e] are obtained by reading TH1tb1[ch] and TH2tb1[ch] from the register 2 and inputting the element e to these LUTs.

BLS1 to BLS8 compare BTh[ch][e] with the input pixel value level IS of Pn, and when IS≧BTh[ch][e] is satisfied, bo[ch][n]=1 indicating that screen dots are outputted to the peripheral pixels Pn is set, and when IS≧BTh[ch][e] is not satisfied, bo[ch][n]=0 indicating that no screen dots are outputted to the peripheral pixels Pn is set.

And, when bo[ch][n] is set in BLS1 to BLS8, an arrangement of eight bo[ch][n] is generated as BO[ch]. Generated BO[ch] is outputted to the outline processing section 8. Further, the arrangement order of bo[ch][n] is optional. The reason is that in the later outline process, BO[ch] is referred to, thus presence of screen dot outputted in the peripheral pixels is judged, and at this time, it is just discriminated that eight bo[ch][n] are all 0 or any one of them is 1, so that there is no need to identify the output position of screen dots.

The outline processing section 8, on the basis of the flag signal BO[ch] input from the BLS block 7 and the flag signal OL input from the outline extracting section 4, adjusts output of screen dots to the outline pixels for the image data SC subject to the screen process by the MLS block 6.

The outline processing section 8 firstly refers to a switch signal LASW input from the controller 1 and when LASW=0, performs no outline process and through-outputs the input image data SC after the screen process. On the other hand, when LASW=1, the outline processing section 8 scans the selected pixel C for the image data SC input from the MLS block 6 and performs the outline process shown in FIG. 7 for the concerned selected pixel.

Figure 7:
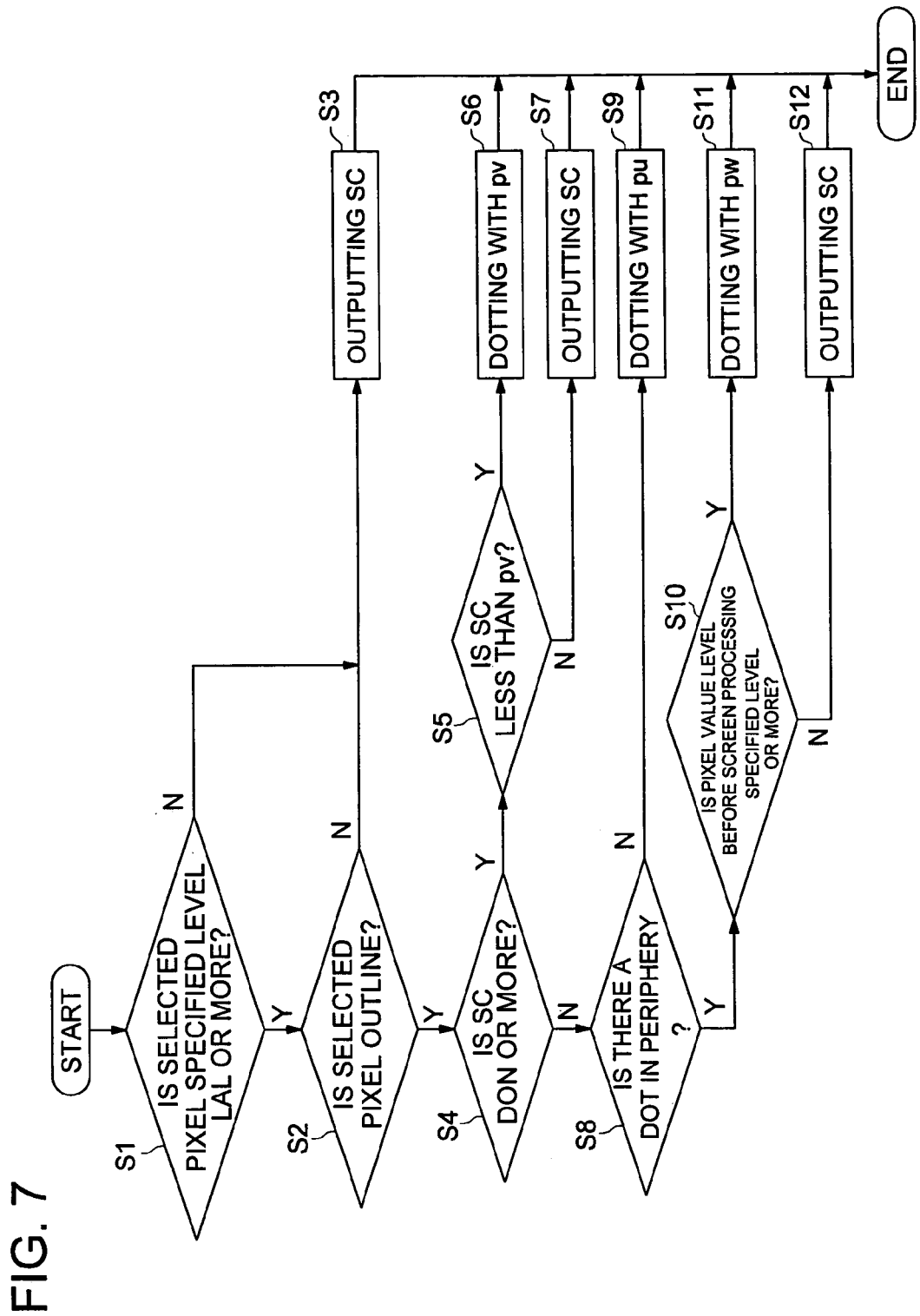
FIG. 7 is a flow chart for explaining the outline process.

In the outline process shown in FIG. 7, the threshold value LAL is firstly read from the register 2, and the threshold value LAL and the pixel value level IS of the selected pixel C are compared, and whether IS is higher than the threshold value LAL or not is discriminated (Step S1). When the image is at extremely low density, the screen dot output level is considerably reduced, so that jaggy does not occur or even if it occurs, it is not conspicuous. Therefore, jaggy becomes conspicuous, and the minimum pixel value level requiring the outline process is set as a threshold value LAL, and it is compared with the pixel value level IS, thus whether the outline process is required for the selected pixel C or not is discriminated.

When the pixel value level IS is lower than LAL (N in Step S1), that is, when there is no need to perform the outline process for the selected pixel C, the pixel value level SC after the screen process is outputted as an output level LA of the selected pixel C. On the other hand, when the pixel value level IS is LAL or higher (Y in Step S1), that is, when the outline process needs to be performed for the selected pixel C, the flag signal OL input from the outline extracting section 4 is referred to, and whether the selected pixel C is an outline pixel or not is discriminated (Step S2). Namely, OL is referred to, thus the outline pixel is identified.

When OL=0 and the selected pixel C is not an outline pixel (N in Step S2), the pixel value level SC after the screen process Is outputted as an output level LA of the selected pixel C. On the other hand, when OL=1 and the selected pixel C is an outline pixel (Y in Step S2), the threshold value DON for judging whether or not to output screen dots is read from the register 2 and whether the pixel value level SC after the screen process is the threshold value DON or higher is discriminated (Step S4).

Depending on the discrimination results, in the following process, the output level LA of the selected pixel C may be changed to pixel value levels indicated by pu, pw, and pv. Firstly, how to obtain the pixel value levels pu, pv, and pw will be explained.

pu, pv, and pw are obtained from Formulas (15) to (17) indicated below.

Expression 8

$$pu = AU[ch] \times IS[ch]/128 + BU[ch] \times 2 \quad (15)$$

$$pv = AV[ch] \times IS[ch]/128 + BV[ch] \times 2 \quad (16)$$

$$pw = AW[ch] \times IS[ch]/128 + BW[ch] \times 2 \quad (17)$$

where when pu, pv, and pw are lower than 0, pu=0, pv=0, and pw=0 and when pu, pv, and pw are higher than 255, pu=255, pv=255, and pw=255.

Further, the parameters AU[ch], AV[ch], AW[ch], BU[ch], BV[ch], and BW[ch] necessary to calculate pu, pv, and pw are read from the register 2 and are input to Formulas (15) to (17).

Namely, pu, pv, and pw are an increase function indicated by a linear expression of the input image data IS and as the input value IS increases, the output values pu, pv, and pw also increase. The coefficients AU[ch], AV[ch], and AW[ch] have a linear inclination and take values from 0 to 255. Further, BU[ch], BV[ch], and BW[ch] indicate an intercept on the axis Y and take values from −128 to 127.

Figure 8:
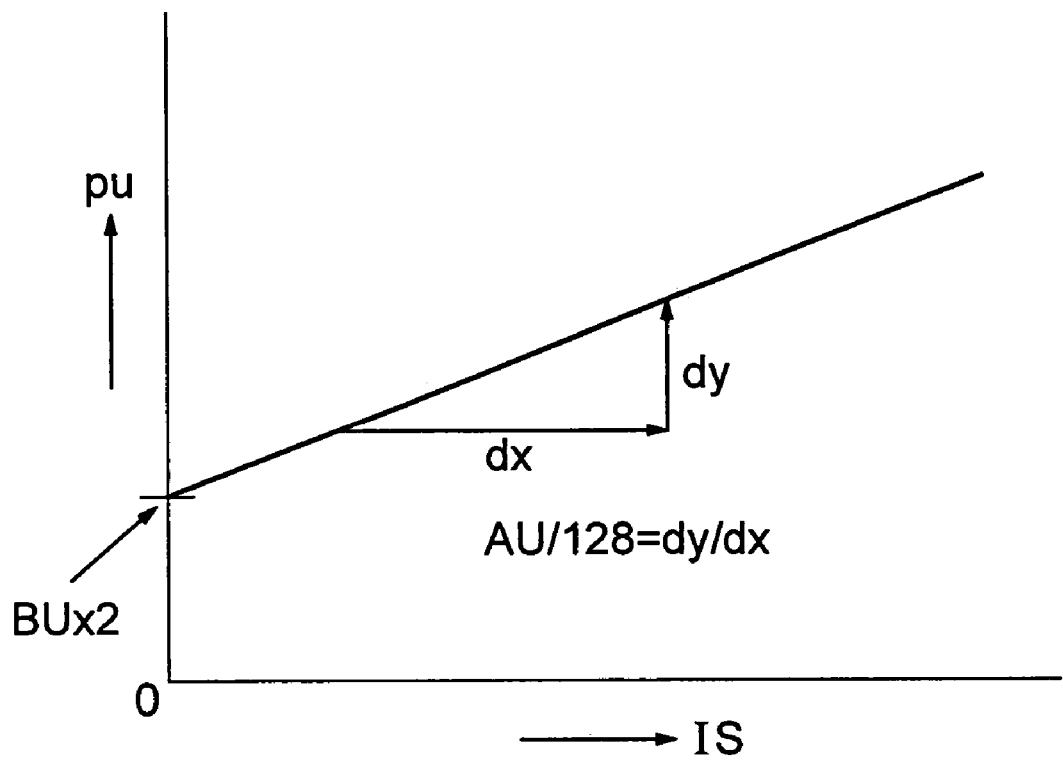
FIG. 8 is a drawing showing the increase function for outputting the output value pu for the input value IS.

For example, pu, as shown in FIG. 8, is a linear function of IS[ch] indicated by an inclination of AU[ch]/128 and a Y intercept of BU[ch]×2.

Again in FIG. 7, a case that SC is the threshold value DON or higher will be explained first.

When SC is the threshold value DON or higher (Y in Step S4), the pixel value level pv is obtained from-Formula (15) by the pixel value level IS of the selected pixel C and whether SC is lower than pv or not is discriminated (Step S5). When SC is lower than pv (Y in Step S5), pv is outputted as an output level LA of the selected pixel C (Step S6). Namely, so as to increase and output the pixel value level lower than pv up to pv, the output level is changed. Further, when SC is pv or higher (N in Step S5), the pixel value level SC after the screen process is outputted as an output level LA of the selected pixel C (Step S7). Namely, a higher pixel value level SC is selected for pv as an output level LA.

Next, a case that SC is lower than the threshold value DON will be explained.

When SC is lower than the threshold value DON (N in Step S4), the flag signal BO input from the BLS block 7 is referred to and whether screen dots are outputted to the peripheral pixels of the selected pixel C or not is discriminated (Step S8). BO is composed of an arrangement of eight bo[ch][n] output by BLS1 to BLS8. Therefore, whether bo[ch][n] are all 0 or not is discriminated, and when all bo[ch][n] are 0, it is discriminated that no screen dots are outputted to all the peripheral pixels, and when at least one of them is 1, it is discriminated that screen dots are outputted to any of the peripheral pixels.

When no screen dots are outputted to all the peripheral pixels (Y in Step S8), the pixel value level pu is obtained by Formula (14) from the pixel value level IS of the selected pixel C and pu is outputted as an output level LA of the selected pixel C (Step S9). Namely, when the outline pixels are at a distance of one pixel or more from the pixels around them to which screen dots are outputted, dots are outputted to the outline pixels to generate isolated points. On the other hand, when screen dots are outputted to any of the peripheral pixels (N in Step S8), LAH is read from the register 2, and the pixel value level IS of the selected pixel C before the screen process is referred to, and whether IS is LAH or higher or not is discriminated (Step S10). LAH is a threshold value for discriminating whether the original pixel value level IS is at high density or not.

When IS is LAH or higher (Y in Step S10), that is, when the original pixel value level IS is at high density, the pixel value level pw is obtained by Formula (16) from the pixel value level IS of the selected pixel C and pw is outputted as an output level LA of the selected pixel C (Step S11). Namely, when the original pixel value level is at high density, a lower pixel value level pw is outputted to prevent a local density increase. Further, when IS is lower than LAH (N in Step S10), the pixel value level SC after the screen process is outputted as an output level LA of the selected pixel C (Step S12).

Figure 9:
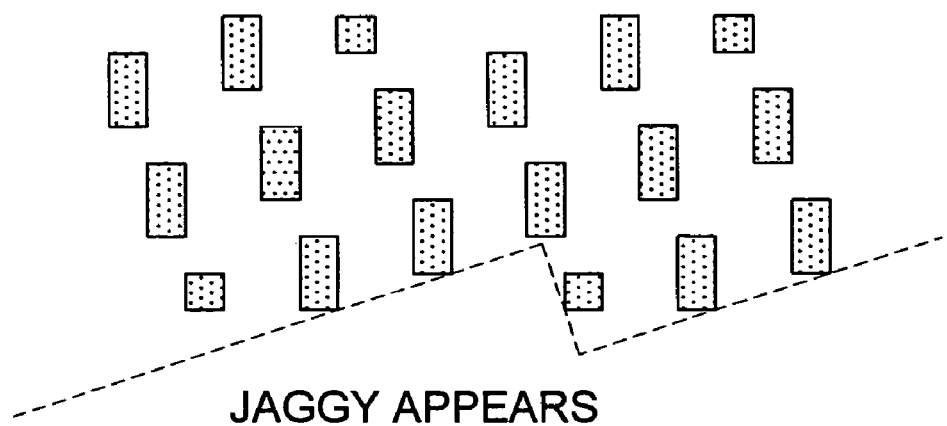
FIG. 9(a) is a drawing showing the outputting condition of the screen dots before execution of the outline process.
FIG. 9(b) is a drawing showing the outputting condition that dots are added by the outline process.
Figure 9:
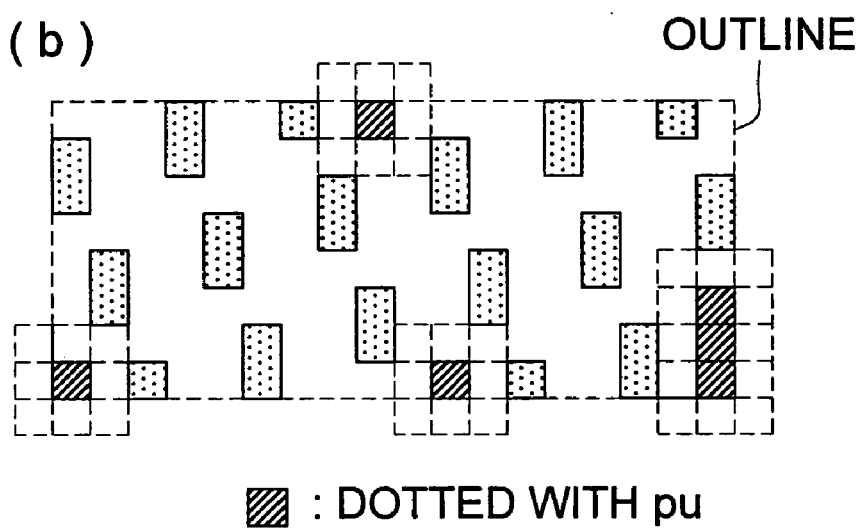
Figure 11:
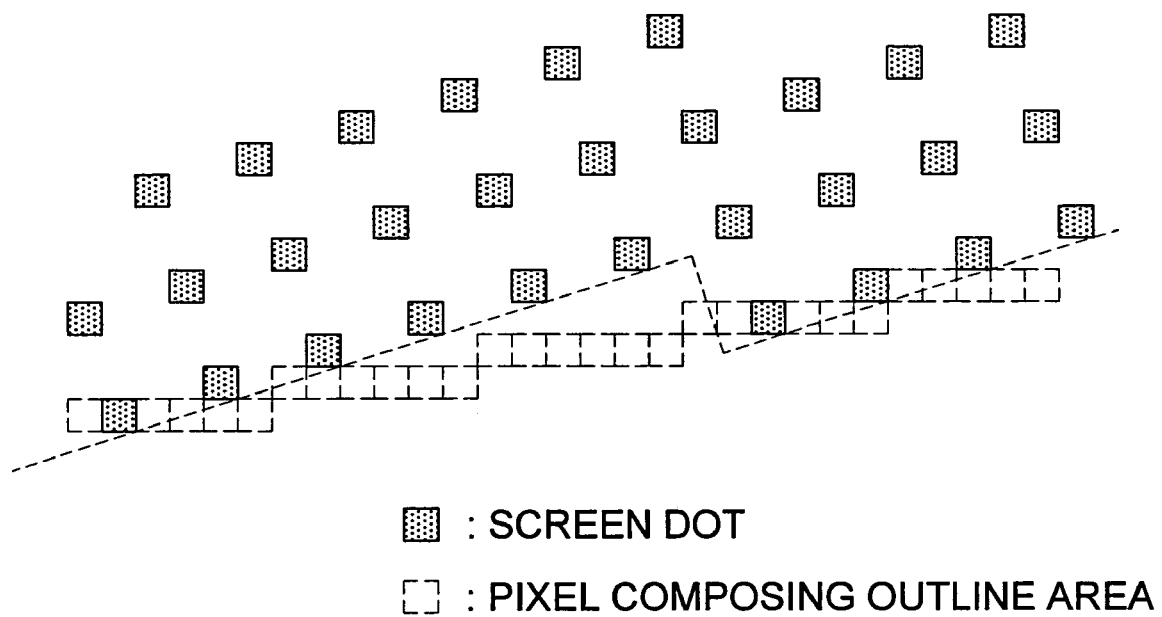
FIG. 11 is a drawing for explaining jaggy caused by the screen process.
Figure 12:
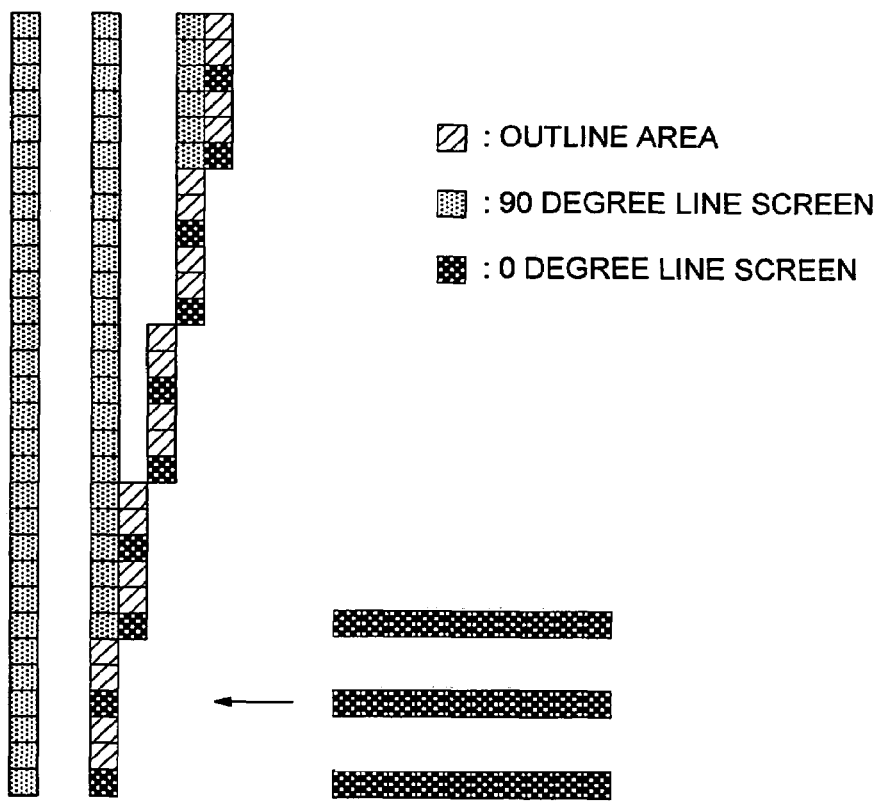
FIG. 12(a) is a drawing for explaining jaggy caused when the line screen pattern is used.
FIG. 12(b) is a drawing for explaining jaggy caused when the dot screen pattern is used.
Figure 12:
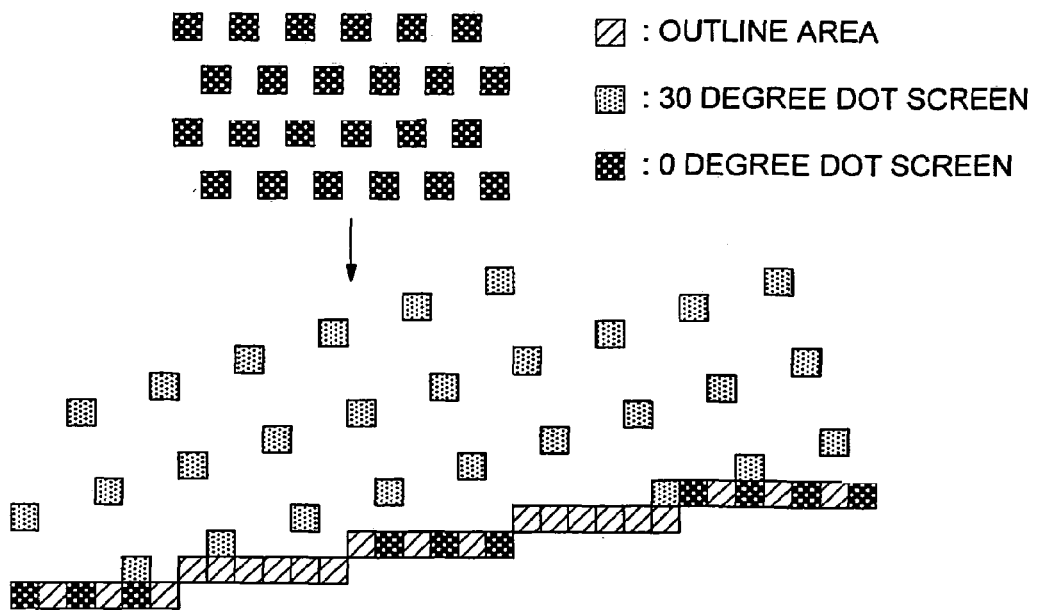

Output examples of the output image data LA aforementioned are shown in FIGS. 9 and 10.

FIG. 9 is a drawing for explaining the outline process performed when the image density is in the low density area.

As shown in FIG. 9(a), in the low density area, the gaps between the screen dots increase in number and a jaggy phenomenon occurs. In this case, when the aforementioned outline process is performed, in the outline area, to the peripheral pixels to which no screen dots are outputted, dots are outputted on the pixel value level pu. By doing this, as shown in FIG. 9(*b*), the gaps between the screen dots can be filled up and jaggy can be cancelled.

Further, FIG. 10 is a drawing for explaining the outline process performed when the image density is in the area of medium density to high density.

As shown in FIG. 10(*a*), when the image density is the medium density or higher, the size of the screen dots is increased, so that the gaps between the screen dots decreases in number and jaggy itself becomes smaller. However, the density is high, so that although jaggy becomes smaller, it becomes clearer. In this case, when the aforementioned outline process is performed, as shown in FIG. 10(*b*), for the outline pixels to which no screen dots are outputted, when the original image data IS is lower than LAH, dots are outputted on the pixel value level pw, and when the original image data IS is LAH or higher, dots are outputted on the pixel value level SC. Further, in the same way as with the low density area, for the outline pixels around which there are no screen dots, dots are outputted on the pixel value level pu. By doing this, jaggy can be cancelled and the outline can be emphasized.

However, when the pixel value level SC when screen dots are outputted to the outline pixels is low, the outline of only the part is seen faint. Therefore, by the aforementioned outline process, as shown in FIG. 10(*c*), when the pixel value level SC of the screen dots in the outline area is lower than the pixel value level pv, the pixel value level pv is outputted and when the pixel value level SC is higher than the pixel value level pv, the pixel value level SC is outputted straight. By doing this, a local density reduction in the outline area can be avoided.

Figure 13:
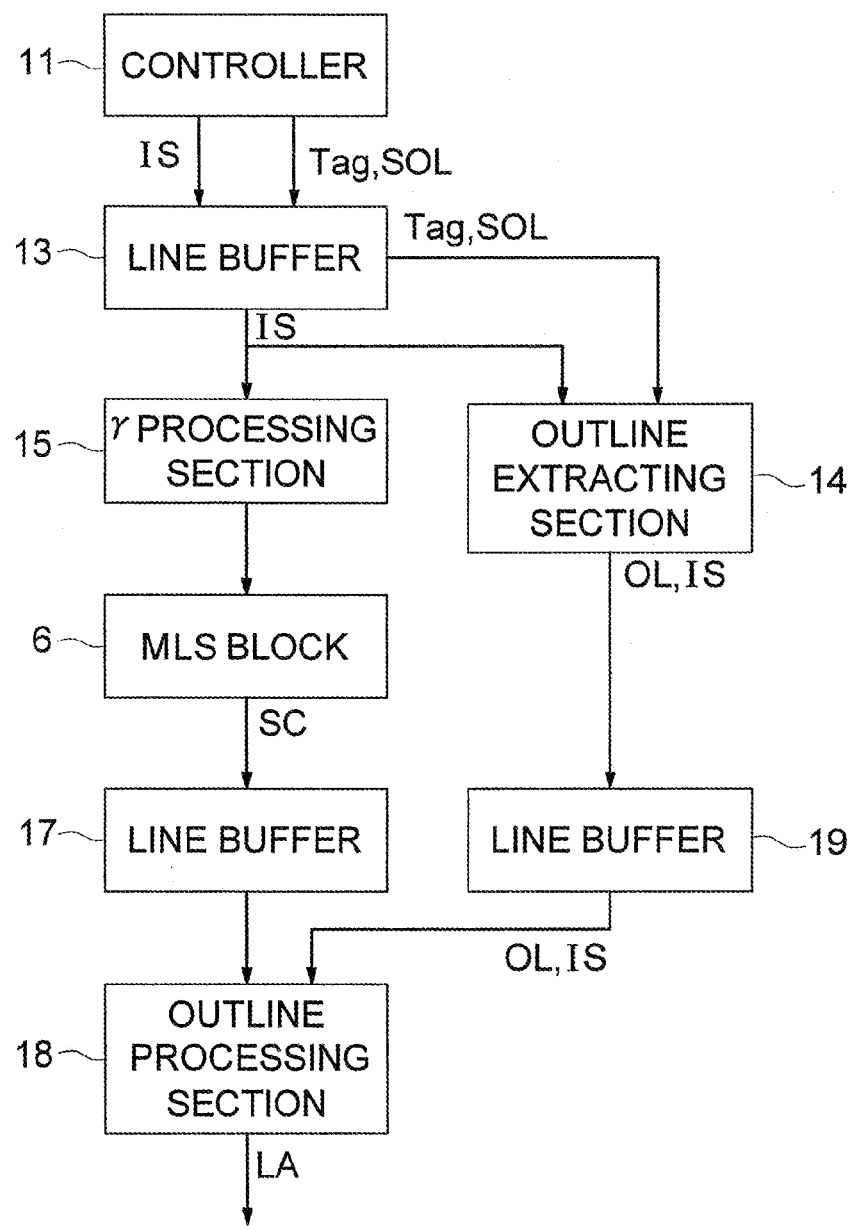
FIG. 13 is a drawing showing the apparatus constitution when the first screen process and second screen process are not performed in parallel.

In the embodiment aforementioned, the screen process by the MLS block 6 and the screen process by the BLS block 7 are performed in parallel with each other, thus the hardware scale can be prevented from increasing. Hereinafter, this respect will be explained. To prevent the hardware scale from increasing, it is important not to use the line buffer as far as possible. The reason is that the line buffer holds image data in correspondence to several lines and only by use of it, the hardware scale is increased. A case that the screen process by the BLS block 7 and the screen process by the MLS block 6 are not performed in parallel with each other will be considered for the time being. The block constitution is, for example, as shown in FIG. 13. The screen process by the BLS block 7 is a one that the screen process by the MLS block 6 is simplified, so that the signal BO obtained from the BLS block 7 can be generated by using the output SC of the MLS block 6. Therefore, the BLS block 7 is not required, thus it seems that the circuit scale is cut down. However, in the outline processing section 18, output of the screen process by the MLS block 6 and output of the screen process by the BLS block 7 are required simultaneously. Therefore, a constitution that the line buffer 17 is newly installed and output of the screen process by the MLS block 6 in the selected pixel and that in the peripheral pixels are obtained simultaneously is necessary. Furthermore, the other information (OL, IS, etc.) required by the outline processing section 18 must be outputted timely, thus the line buffer 19 is necessary also here. As a result, ever so many line buffers are necessary and the hardware results in a large scale. Therefore, in this embodiment, as shown in FIG. 1, the screen process by the MLS block 6 is performed before or simultaneously with the screen process by the BLS block 7, thus at least the line buffer 19 as shown in FIG. 13 is made unnecessary, and furthermore, the edge extracting section 4 and the BLS block 7 shown in FIG. 1 are installed in parallel with each other, thus the line buffer can be shared, and the line buffer 17 as shown in FIG. 13 is made unnecessary, and the hardware scale can be prevented from increasing. Although the BLS block 7 is installed newly, the circuit scale can be made sufficiently small compared with that of the line buffer.

As mentioned above, according to this embodiment, in the BLS block 7, whether screen dots are outputted to the peripheral pixels of the outline pixels or not is discriminated, and in the outline processing section 8, according to the outputting condition of screen dots to the peripheral pixels and outline pixels, whether or not to output screen dots to the outline pixels is decided, so that screen dots can be added to the outline pixels and jaggy can be prevented from an occurrence.

Further, in the outline processing section 8, when no screen dots are outputted to the peripheral pixels of the outline pixels, dots are outputted to the outline pixels and the output level thereof is set to the pixel value level pu, so that dots can be added to the outline pixels in the area where few screen dots are outputted and jaggy can be prevented from an occurrence.

Further, when screen dots are outputted to the outline pixels, those screen dots are outputted on the pixel value level SC or pv, and also when no screen dots are outputted, according to the outputting condition of screen dots to the peripheral pixels, screen dots are added on the pixel value level pu, and when the original pixel value level IS is high, screen dots are added on the pixel value level pw, so that by this addition of screen dots, the outline can be formed. By forming of the outline, an object such as characters becomes clear in the outline and the visual resolution is improved.

Further, the output levels pu, pv, and pw of screen dots increase as the original pixel value level IS of the outline pixels increases, that is, are decided according to the original pixel value level, so that dots can be added unless the gradation of an original image is lost.

Further, in the multilevel screen process by the MLS block 6, the output level after the screen process is obtained for each pixel, so that the outline process may be performed on the basis or the results of the screen process. However, in this embodiment, the BLS block 7 is installed and it performs a simple screen process of only judging whether screen dots are outputted to the peripheral pixels of the respective outline pixels or not. By doing this, the outputting condition of screen dots can be discriminated by a simple constitution, and the process relating to the discrimination can be performed simultaneously with the multilevel screen process by the MLS block 6, so that the processing efficiency can be improved.

Further, this embodiment is a preferred example of the image processing apparatus 10 to which the present invention is applied and is not limited to it.

For example, in the embodiment aforementioned, presence of screen dots in the eight peripheral pixels existing around the selected pixel is discriminated, and when there are no screen dots at all, screen dots on the output level pu are added. However, instead of this condition, the range of execution of the screen process by the BLS block 7 is extended, and for 24 peripheral pixels existing in the area of 5 pixels×5 pixels, the screen process is performed, and presence of screen dots at the position away from the selected pixel C by two pixels is discriminated, and in this way, the distance from the selected pixel C for discriminating presence of screen dots may be changed.

Further, not only presence of screen dots is discriminated but also the number of pixels to which screen dots are outputted among the eight peripheral pixels is detected and whether or not to output screen dots may be decided according to the number of peripheral pixels to which screen dots are outputted such that for example, when the number of detected pixels is 0 to 2, screen dots are added. Further, the output level at that time may be changed according to the number of pixels.

Further, in the outline pixels to which screen dots are added, according to whether screen dots are outputted to the peripheral pixels or not, the output level thereof is decided as, for example, the pixel value levels pu and pw. However, instead of whether screen dots are outputted to the peripheral pixels or not, according to the pixel value level of the peripheral pixels, the output level thereof may be decided. For example, the pixel value level SC after the screen process of the peripheral pixels is referred to and when SC is lower than LAH, the output level of the outline pixels is decided as pu.

According to the above described embodiment, whether or not to output dots to the outline pixels is controlled according to the outputting condition of the screen dots of the peripheral pixels of the outline pixels, so that resolution or effective reduction of jaggy can be realized easily. For example, when there is an area of few screen dots around the outline, that is, an area where the output interval of neighboring screen dots is large, if it is decided to output dots to the outline pixels, the gaps between the respective screen dots are filled up, thus jaggy can be cancelled or effectively reduced. Further, by controlling output of dots to the outline, the outline area is emphasized and the visual resolution of the image can be improved easily.

According to the above described embodiment, when the output interval of the screen dots on the outline or around it is a specified distance or longer, if it is decided to output dots to the outline pixels, the gaps between the respective screen dots are filled up and jaggy can be cancelled or effectively reduced.

According to the above described embodiment, when there are few peripheral pixels for outputting the screen dots, the output interval of screen dots is large, so that it is decided to output dots to the outline pixels, and when there are many peripheral pixels for outputting the screen dots, the output interval of screen dots is small, so that it is decided not to output dots to the outline pixels, thus according to the number of peripheral pixels for outputting screen dots, the outputting condition of dots for the outline pixels can be adjusted. Therefore, jaggy can be cancelled or effectively reduced.

According to the above described embodiment, for example, the output level of the outline pixels is changed according to the output interval of screen dots, and when the original pixel value level of the outline pixels is small, the output level thereof is reduced, thus the output level is adjusted, and the output image quality can be improved. Further, an output apparatus such as a printer may have output characteristics that for isolated dot output, the response is slow and the density is reduced and for continuous dot output, the response is improved and the density is increased. However, when the output level of dots is adjusted according to the output interval of screen dots, the variation in density due to such output identification can be reduced and the image quality can be prevented from deterioration.

According to the above described embodiment, when the pixel value level of the outline pixels and peripheral pixels thereof is small, the output level of dots is reduced, thus the output level can be adjusted according to the original (before the screen process) pixel value level and the gradation of an original image can be reflected on an output image.

According to the above described embodiment, the outline pixels can be easily identified by the outline information.

According to the above described embodiment, outline information can be generated according to the image kind such as a line drawing, characters, or a picture image. For example, when a picture image requires no emphasis of the outline, the information on the outline of the picture image is excluded from the outline information, thus the outline area of the picture image can be removed from an object of the outline process. Whether or not to perform the outline process can be controlled like this according to the image kind of the outline information, thus the output image quality can be improved.

According to the above described embodiment, the screen process suited to judgment of the outline pixel control and the screen process to be performed for the image data used as an object of the actual outline pixel control can be used appropriately, and efficient outline image control can be realized without making a sacrifice of the image quality of the image data as an output result.

According to the above described embodiment, the outputting condition of screen dots to the peripheral pixels can be discriminated by a simple constitution. When changing the output level of the outline pixels due to presence of output of screen dots to the peripheral pixels, if only presence of output of screen dots can be discriminated, the output interval of screen dots can be judged. Therefore, by performing the screen process requiring only presence of output of screen dots instead of the screen process requiring the output level of the peripheral pixels, a simple and quick screen process can be realized. Further, for the pixels unnecessary for judgment of the outline pixel control, the screen process can be omitted and more efficient outline pixel control can be realized.

According to the above described embodiment, the screen processes for the outline pixels and peripheral pixels are performed in parallel with each other, thus the hardware scale can be suppressed.

According to the above described embodiment, depending on presence of output of screen dots to the peripheral pixels of the outline pixels after the screen process or on the output level thereof, the output level of the outline pixels can be adjusted. Therefore, the output level of the output pixels can be controlled and cancellation or effective reduction in jaggy can be realized easily. For example, in an area at a small output interval of screen dots in the outline pixels or peripheral pixels, the outline pixels are changed from no output (the output level is 0) of dots to output (the output level is larger than 0), and the gaps between the respective screen dots can be filled up, and jaggy can be cancelled or effectively reduced. Further, an output apparatus such as a printer may have output characteristics that for discontinuous dot output, the response is slow and the density is reduced and for continuous dot output, the response is improved and the density is increased. However, when the output level of dots in the outline is adjusted according to the output interval of screen dots, the variation in density due to such output identification can be reduced and the image quality can be prevented from deterioration.

According to the above described embodiment, the screen process suited to judgment of the outline pixel control and the screen process to be performed for the image data used as an object of the actual outline pixel control can be used appropriately, and efficient outline image control can be realized without making a sacrifice of the image quality of the image data as an output result.

According to the above described embodiment, the outputting condition of screen dots to the peripheral pixels can be discriminated by a simple constitution. When changing the output level of the outline pixels due to presence of output of screen dots to the peripheral pixels, if only presence of output of screen dots can be discriminated, the output interval of screen dots can be judged. Therefore, by performing the screen process requiring only presence of output of screen dots instead of the screen process requiring the output level of the peripheral pixels, a simple and quick screen process can be realized. Further, for the pixels unnecessary for judgment of the outline pixel control, the screen process can be omitted and more efficient outline pixel control can be realized.

According to the above described embodiment, the screen processes for the outline pixels and peripheral pixels are performed in parallel with each other, thus the hardware scale can be suppressed.

According to the above described embodiment, when the pixel value level of the outline pixels and peripheral pixels thereof is small, the output level of dots is reduced, thus the output level can be adjusted according to the original pixel value level and the gradation of an original image can be reflected on an output image.

What is claimed is:

1. An image processing apparatus comprising:
    an outline extracting section for extracting an outline pixel composing an outline area of an image;
    a first screen processing section for performing a multi-level screen processing to image data of the image;
    a second screen processing section for performing a bi-level screen processing to estimate a screen dot output condition for a peripheral pixel of the outline pixel, wherein the screen dot output condition specifies whether or not a screen dot is outputted for the peripheral pixel; and
    an outline processing section for determining whether to output or not to output a dot with respect to the outline pixel extracted by the outline extracting section and subjected to the multi-level screen processing by the first screen processing section, based on the screen dot output condition estimated by the second screen processing section for the peripheral pixel of the outline pixel.

2. The image processing apparatus of claim 1, wherein the outline processing section determines to output the dot with respect to the outline pixel, when the outline pixel and a pixel for which a screen dot is estimated to be outputted by the second screen processing section are apart from each other by at least a prescribed distance.

3. The image processing apparatus of claim 1, wherein the outline processing section judges a number of peripheral pixels for which screen dots are estimated to be outputted by the second screen processing section in an area within a prescribed region from the outline pixel, and according to a result of judging the number, the outline processing section determines whether to output the dot with respect to the outline pixel.

4. The image processing apparatus of claim 1, wherein when it is determined to output the dot with respect to the outline pixel, the outline processing section determines an outputting level of the dot.

5. The image processing apparatus of claim 4, wherein the outline processing section determines the outputting level of the dot according to a pixel value level of the outline pixel or of the peripheral pixel.

6. The image processing apparatus of claim 1, wherein the outline extraction section creates outline information indicating the outline pixel composing the extracted outline area, and
    wherein the outline processing section identifies the outline pixel based on the outline information created by the outline extracting section.

7. The image processing apparatus of claim 6, wherein the outline extracting section creates the outline information based on inputted PDL (Page Description Language) information or image distinguishing signals inputted with the image data.

8. The image processing apparatus of claim 1, wherein the multi-level screen processing by the first screen processing section and the bi-level screen processing by the second screen processing section are performed in parallel.

9. An image processing apparatus comprising:
    an outline extracting section for extracting an outline pixel composing an outline area of an image;
    a first screen processing section for performing a multi-level screen processing to image data of the image;
    a second screen processing section for performing a bi-level screen processing to estimate a screen dot output condition for a peripheral pixel of the outline pixel, wherein the screen dot output condition specifies whether or not a screen dot is outputted for the peripheral pixel; and
    an outline processing section for changing an output level for the outline pixel extracted by the outline extracting section and subjected to the multi-level screen processing by the first screen processing section, based on the screen dot output condition estimated by the second screen processing section for the peripheral pixel of the outline pixel.

10. The image processing apparatus of claim 9, wherein the multi-level screen processing by the first screen processing section and the bi-level screen processing by the second screen processing section are performed in parallel.

11. The image processing apparatus of claim 9, wherein the outline processing section changes the output level for the outline pixel according to a pixel value level of the outline pixel or of the peripheral pixel.

* * * * *

UNITED STATES PATENT AND TRADEMARK OFFICE
CERTIFICATE OF CORRECTION

| | |
|---|---|
| PATENT NO. | : 7,619,627 B2 |
| APPLICATION NO. | : 11/247865 |
| DATED | : November 17, 2009 |
| INVENTOR(S) | : Koji Washio |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 700 days.

Signed and Sealed this

Twenty-sixth Day of October, 2010

David J. Kappos
*Director of the United States Patent and Trademark Office*